United States Patent [19]

Sedlmayr

[11] Patent Number: 4,867,530
[45] Date of Patent: Sep. 19, 1989

[54] LOW RESOLUTION FIBER OPTIC LIGHT TRANSFER DEVICE

[75] Inventor: Steven R. Sedlmayr, Golden, Colo.

[73] Assignee: Advance Display Technologies, Inc., Golden, Colo.

[21] Appl. No.: 220,410

[22] Filed: Jul. 19, 1988

Related U.S. Application Data

[63] Continuation of Ser. No. 25,961, Mar. 16, 1987, abandoned, which is a continuation-in-part of Ser. No. 575,816, Feb. 1, 1984, Pat. No. 4,650,280.

[51] Int. Cl.$^4$ ............................ G02B 6/08; F21V 7/04
[52] U.S. Cl. ............................... 350/96.27; 350/96.10; 350/96.25; 350/96.28; 362/32; 358/901
[58] Field of Search ............... 350/96.24, 96.25, 96.26, 350/96.27, 96.28, 96.10; 358/901; 362/32

[56] References Cited

U.S. PATENT DOCUMENTS

| | | | |
|---|---|---|---|
| 3,043,910 | 7/1962 | Hicks, Jr. | 350/96.27 |
| 3,141,105 | 7/1964 | Courtney-Pratt | 350/96.24 |
| 3,644,922 | 2/1972 | James et al. | 350/96.24 |
| 4,173,391 | 11/1979 | Schure et al. | 350/96.25 |
| 4,208,096 | 6/1980 | Glenn, Jr. | 350/96.25 |
| 4,650,280 | 3/1987 | Sedlmayr | 350/96.27 |
| 4,738,510 | 4/1988 | Sansom | 350/96.25 |
| 4,773,730 | 9/1988 | Sedlmayr | 350/96.27 |
| 4,786,139 | 11/1988 | Sedlmayr | 350/96.27 |

OTHER PUBLICATIONS

Casler, "Manufacturing Matched Fiber Optical Arrays" IBM Tech. Discl. Bull., vol. 14, No. 3, 8/71 p. 829.

*Primary Examiner*—William L. Sikes
*Assistant Examiner*—Brian M. Healy
*Attorney, Agent, or Firm*—David H. Judson

[57] ABSTRACT

A fiber optic light transfer device with variable resolution comprises a plurality of optical fibers arranged at one end thereof as a series of spaced, parallel fiber ribbons. The ribbons are supported in a locator body having a plurality of spaced, parallel slots therein each defined by first, second and third support surfaces and an end surface of the locator body. Each of the slots includes one or more projections selectively spaced along the first support surface for supporting the associated fiber ribbon in the slot such that one or more of the fibers therein are are in a spaced relationship. Preferably, the fiber optic light transfer device includes "n" parallel fiber ribbons each including "n" optical fibers.

10 Claims, 6 Drawing Sheets

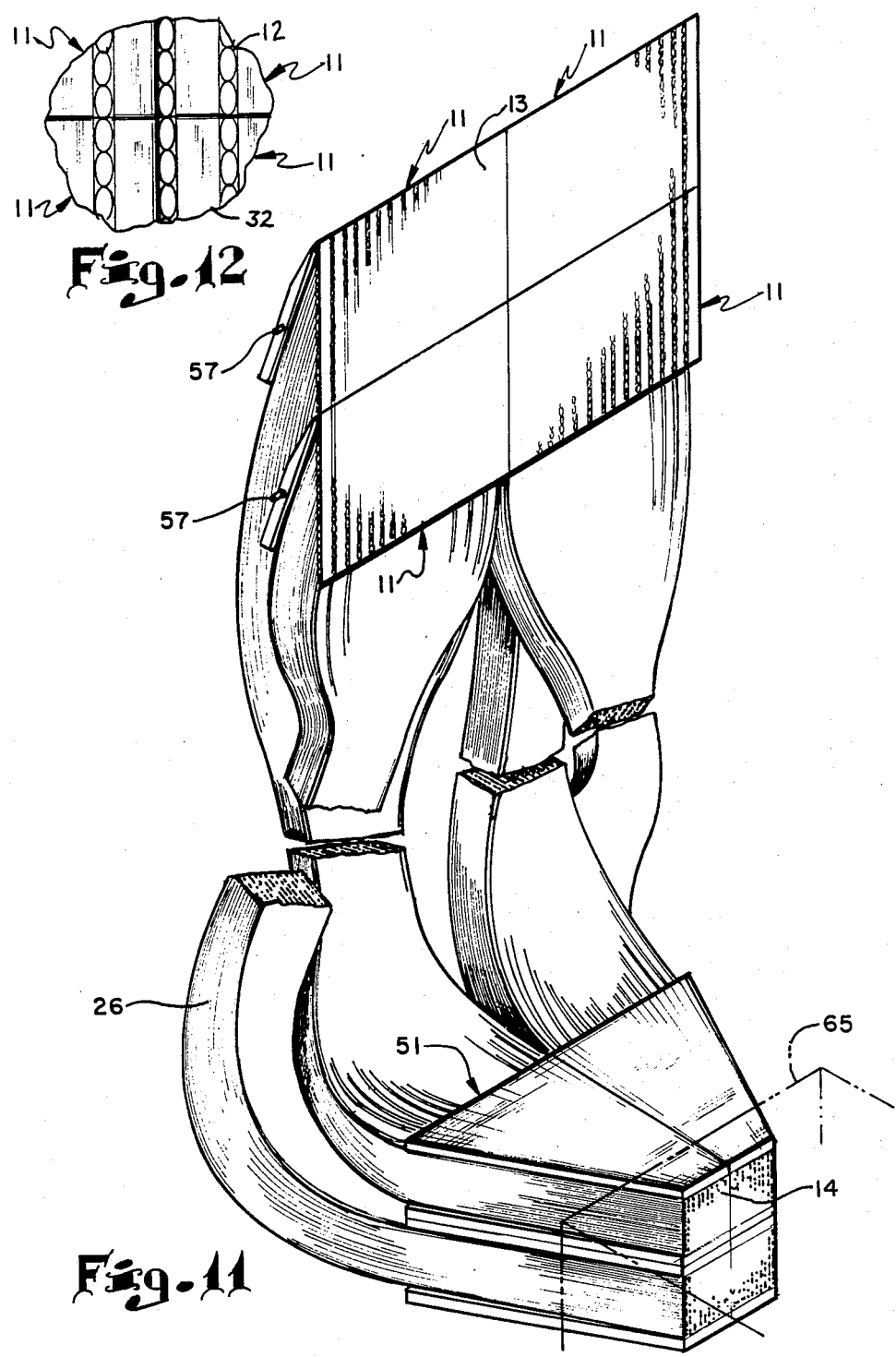

LOW RESOLUTION FIBER OPTIC LIGHT TRANSFER DEVICE

This application is a continuation of application Ser. No. 07/025,961, filed Mar. 16, 1987.

This application is a continuation-in-part of prior copending application Ser. No. 575,816, filed 1, 1984, now U.S. Pat. No. 4,650,280, entitled Fiber Optic Light Transfer Device, Modular Assembly and Method of Making.

TECHNICAL FIELD

The present invention relates generally to novel and improved fiber optic light transfer devices and more particularly to a fiber optic display screen with varying resolution capabilities.

BACKGROUND OF THE INVENTION

The prior art fiber optical light or image transfer devices in general have been relatively complicated to manufacture, cumbersome, space consuming and economically prohibitive for widespread commercial use. The prior art has recognized the need for accurately locating and aligning each fiber in an array but the relatively small size of each fiber and the brittleness thereof make this difficult.

Hicks U.S. Pat. No. 3,043,910 describes the use of relatively thin, flat spacer strips inclined at an angle to the lengthwise extent of the fibers. Such strips do not accurately locate and/or hold the fibers in precise location to one another in each of the three planes that are perpendicular to one another. The particular problem that is not solved by Hicks is the tendency for one ribbon to skew, squirrel or twist relative to the other ribbons along the length of the fibers.

Glenn's U.S. Pat. Nos. 4,116,739 and 4,208,096 attempt to solve the problem of accurate alignment and location of the fibers in relation to one another by using a spirally wound construction. This approach, however, also does not accurately locate and hold the fibers in the three mutually perpendicular planes.

Further deficiency in the above discussed prior art is the lack of a satisfactory construction for expanding a basic light transfer unit to larger size units without sacrificing the resolution.

BRIEF SUMMARY OF THE INVENTION

In accordance with the present invention there is provided a light transfer device for image transfer purposes and the like including an optical fiber locator body having a multiplicity of parallel internal slots. Each slot has first and second fiber supporting surfaces disposed in first and second mutually perpendicular planes, respectively. First and second supporting surfaces of a reference slot locate a reference end fiber that extends perpendicular to a third plane, which is perpendicular to the other two planes. The first and second supporting surfaces of further slots locate further end fibers at equally spaced intervals and in the first plane and locate further fiber ribbons in planes parallel to the reference second plane to precisely locate the fibers in relation to the reference fiber and, when adhered to the associated supporting surface, hold the fibers against relative movement in three planes that are perpendicular to one another. The located fibers are cut along a plane that is rotated 90° to the reference plane and at a slight angle to the rotated plane to define an end surface of cut fiber ends. Preferably a locator body is provided at each end of the fibers to maintain the relative positions of each fiber in relation to one another. The method of making involves supporting intermediate portions of the fibers in a block with the slots of a block made up of a plurality of stacked channel-shaped locator members that is cut on a diagonal to form two identical light transfer devices that will stack side by side and end to end to form a modular assembly.

BRIEF DESCRIPTION OF THE DRAWINGS

The details of this invention will be described in connection with the accompanying drawings, in which:

FIG. 11 is a modular assembly of four of the eight transfer devices shown in FIG. 1;

FIG. 12 is a fragmentary plan view of the central portion of the modular assembly shown in FIG. 11.

DETAILED DESCRIPTION

Figure 1:
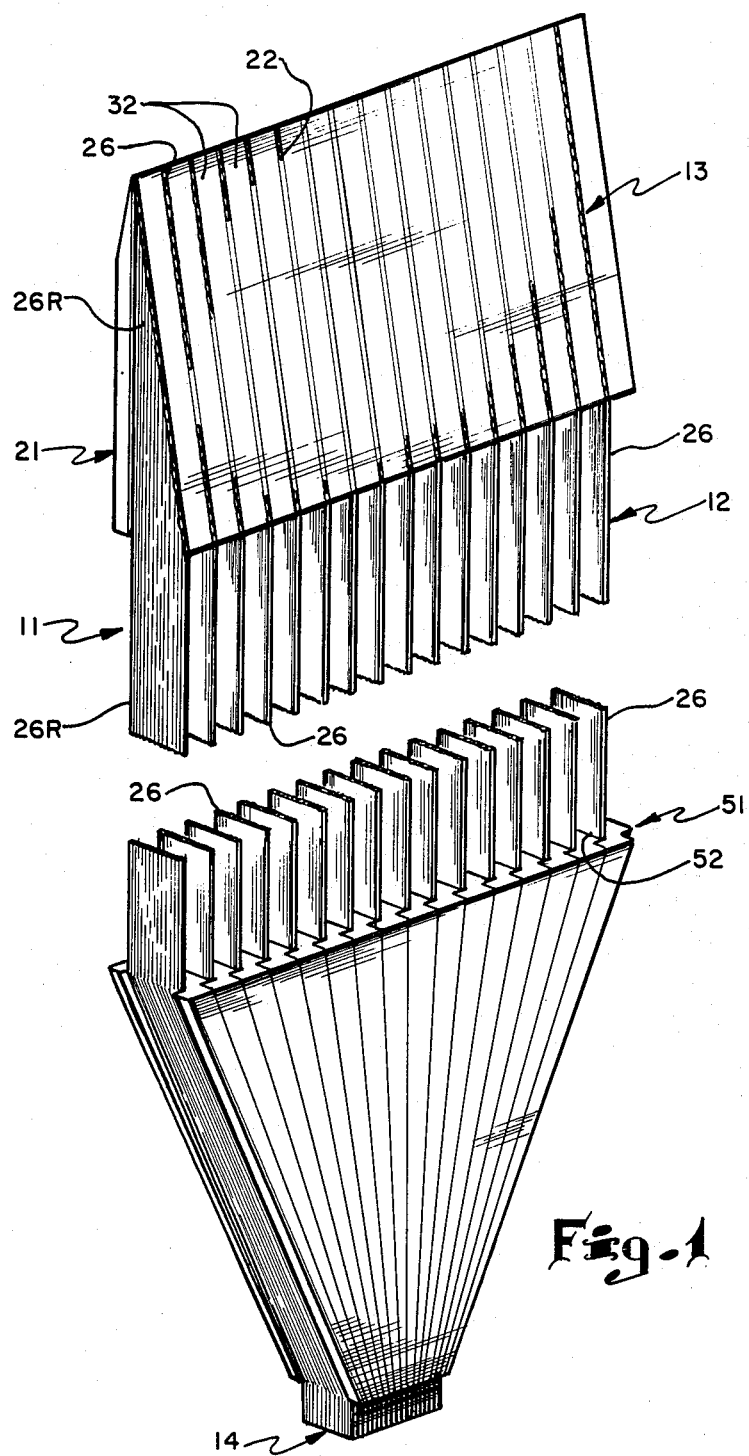
FIG. 1 is a perspective view of a light transfer device embodying features of the present invention.
Figure 2:
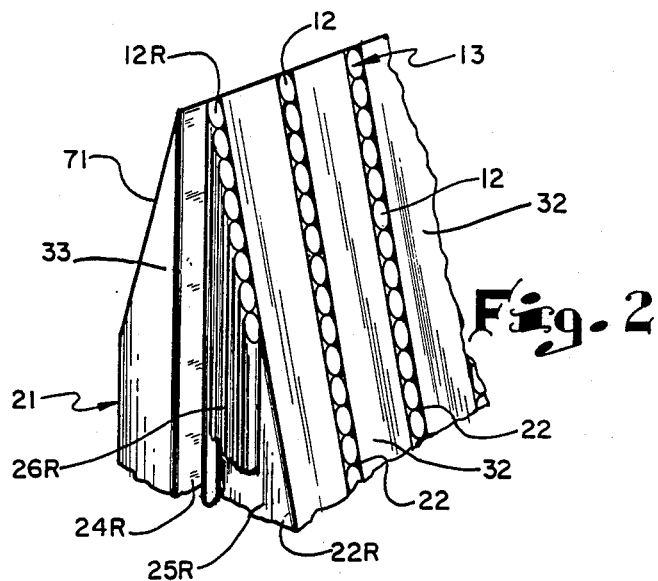
FIG. 2 is an enlarged perspective view of the upper left corner of the device shown in FIG. 1 with a portion of one fiber ribbon removed.

Referring now to FIG. 1, there is shown a light transfer device 11 according to the present invention including a plurality of optical fibers 12 forming an end surface 13 at one end and end surface 14 at the opposite end. In general, light will travel through light transfer device 11 and pass into either end surface in either direction (bi-directional) so that the end surfaces 13 and 14 are alternately a viewing surface or a light projecting surface.

The optical fibers 12 have adjacent end portions supported by a locator body 21. Body 21 is generally wedge-shaped and is formed with a multiplicity of interior parallel slots 22 extending therethrough with longitudinally facing openings at the ends, the slot to the far right as seen in FIG. 1 being open and the remaining slots being closed and all of the slots being of an identical size in transverse cross section.

The locator body 21, generally stated, has fiber supporting surfaces provided by slots 22 which precisely locate the optical fibers in relation to one another and, when adhered to these supporting surfaces, mechanically hold the fibers 12 in a fixed position relative to one another.

Figure 3:
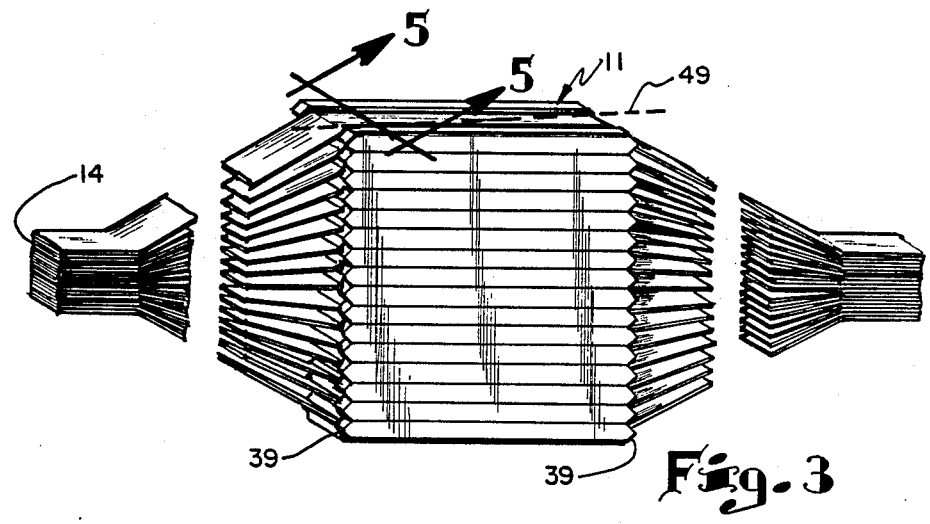
FIG. 3 is a perspective view illustrating a preferred method of making the device of FIG. 1 with the second locator members omitted.
Figure 4:
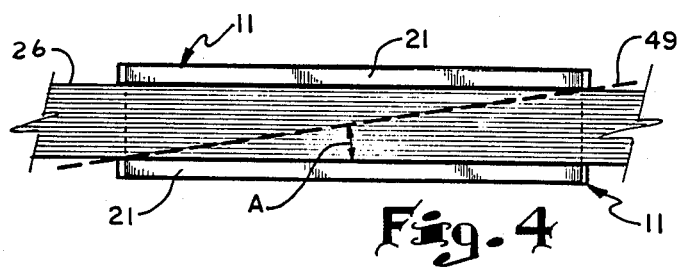
FIG. 4 is a top plan view of the assembly of FIG. 3.
Figure 5:
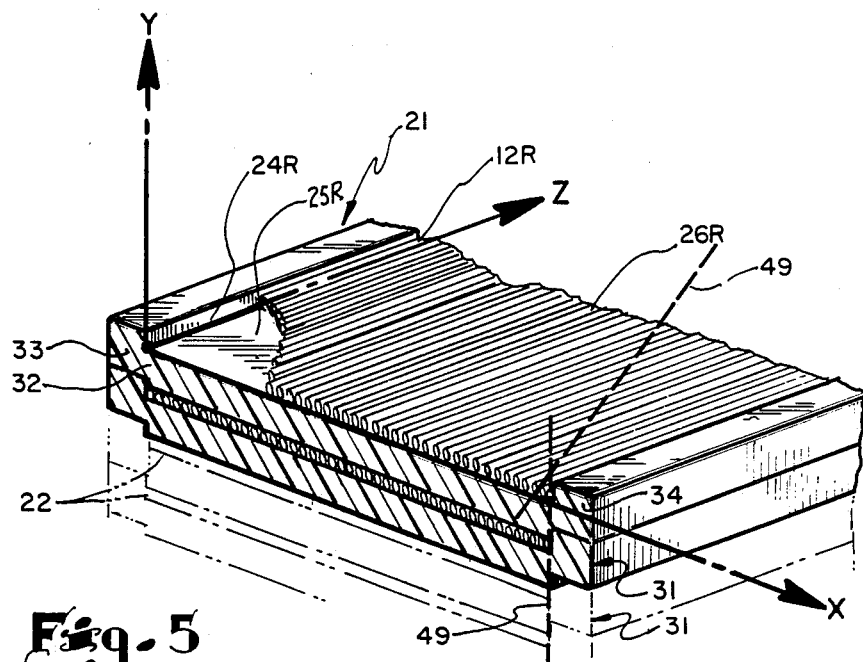
FIG. 5 is a sectional view taken along lines 5—5 of FIG. 3 with a portion of the fiber ribbon removed from the open slot.

For the purpose of further defining the fiber supporting surfaces and their positions relative to one another, reference is made to FIG. 5 and to the use of a Cartesian coordinate system with an X, Y, Z axis located on the upper left corner of the open slot, as seen in FIG. 5, which is selected as the reference slot and designated 22R. By definition the axes X, Y, and Z of a Cartesian coordinate system are perpendicular to one another, as are the three planes XZ, YZ, and YX defined by these axes. The suffix "R" is used to distinguish the reference slot and the surfaces forming this slot from the further slots and to designate the fibers carried in the reference slot. FIGS. 3–5 show the preferred structure that is used to form two identical light transfer devices, as is described hereinafter.

The reference slot 22R related to the coordinate system in FIG. 5 has a first reference supporting surface 24R in the YZ plane for a reference end fiber 12R and a second reference surface 25R in the XZ plane for the reference end fiber 12R. These surfaces 24R and 25R locate the reference end fiber 12R along the YZ and XZ planes, respectively, and perpendicular to the YX plane.

Each additional slot 22 in body 21, then, has what is referred to as a first supporting surface 24 in the YZ plane and a second supporting surface 25 in a second plane parallel to and displaced a fixed distance from the reference second plane.

These first and second supporting surfaces locate the fibers and, when adhered to the fibers, mechanically hold the fibers against movement relative to one another in three mutually perpendicular planes, which prevents the plurality of spaced fiber ribbons from being skewed or squirreled at an angle along the lengths thereof.

A preferred method of making the above described locator body is to use a plurality of identical generally channel-shaped locator members 31 stacked one on another, as shown in FIGS. 3–6.

Each locator member 31 has a spacer portion 32 and stepped out projecting portions 33 and 34, at the opposite ends of the spacer portion, together with stepped in notched portions 43 and 54 opposite projecting portions 43 and 54 opposite projecting portions 33 and 34, respectively. For reference purposes the spacer portion 32 has oppositely disposed surfaces 25 and 45, projecting portion 33 has surfaces 24 and 38 at right angles to one another, projecting portion 34 has surfaces 44 and 48 at right angles to one another, notched portion 43 has surfaces 36 and 37 at right angles to one another, and notched portion 54 has surfaces 46 and 47 at right angles to one another. The notched portions 43 and 54 are complementary in shape with projections 33 and 34 but are not as deep as the projections so that, when the notched portions 43 and 54 are placed on the projecting portions of another locator member 31 in a nesting or stacked relation, the spacing for slot 22 is formed. It will be noted that surfaces 24 and 37 are in the same plane and surfaces 44 and 47 are in the same plane.

Referring now to FIG. 3, the ends of each locator member are shown tapered or V-shaped, as indicated at 39, so that there are no sharp corners or right angle bends for the relatively brittle fibers.

In a preferred procedure for making the device 11 using the channel-shaped locator member as above discussed, an adhesive is placed along the inside of the channel of one member 31 and a fiber ribbon 26 is placed on the inside surfaces with the end fibers of the ribbon abutting against adjacent inside surfaces 24 and 44 to hold the ribbon in place. Preferably, the channel defined by surfaces 24 and 44 is the same width as the fiber ribbon.

The adhesive is placed on the top of the ribbon so disposed in the channel and on surfaces 48 and 38. A second locator member 31 is placed on the first with the spacer portion surfaces 37 and 47 inserting into the channel surfaces 24 and 44, respectively, the spacer portion surface 45 pressing down on the top of the fiber ribbon. Succeeding locator members 31 and fiber ribbons are stacked one on the other until the desired stack is achieved. The depth of the stack establishes the lateral extent of the body 21, as seen in FIG. 1.

The fibers 12 secured in the assembled channel-shaped locator member 31 are then cut down through the stack, as shown in FIG. 3, along a plane designated 49 that is rotated 90° to the plane of the fiber ribbon or XZ plane and at a slight angle, designated A, to the rotated plane to define the end surface 13 with the cut fiber ends.

This method of making provides two identical light transfer devices 11. A sharp angle A provides greater surface area. A preferred angle A is between 8° and 10° to the axis of the fibers.

The opposite end portions of the fibers 12 preferably are supported in the same manner, using a locator body 51 with interior slots 52, again shown as made up of a plurality of channel-shaped locator members 61 stacked one on another in the same manner as are locator members 31 above described. These channel-shaped members preferably have the same channel width as the ribbon but decrease in thickness along their length to bring the fibers to a solid bundle having a uniform array of rows and columns at the end surface 14.

Figure 6:
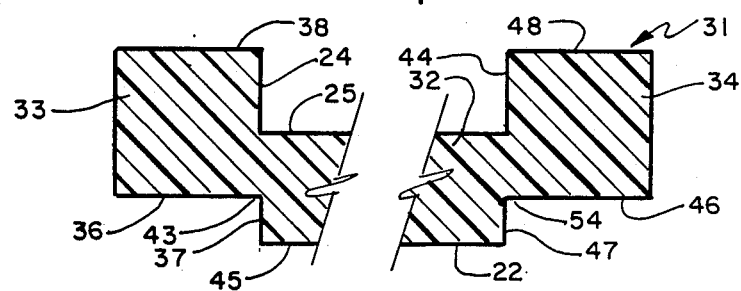
FIG. 6 is a fragmentary cross-sectional view of the locator body shown in FIG. 5.

An alternative to the stacked channel-shaped locator members above described would be to form a unitary rectangular block 61 and to use a cutting tool such as a laser to form the reference slot 22R and slots 22 for a ribbon of fibers, as is illustrated in FIG. 6. An adhesive would be placed on the ribbon and the ribbon of fibers would be slid through the longitudinally facing openings of the slots.

Figure 10:
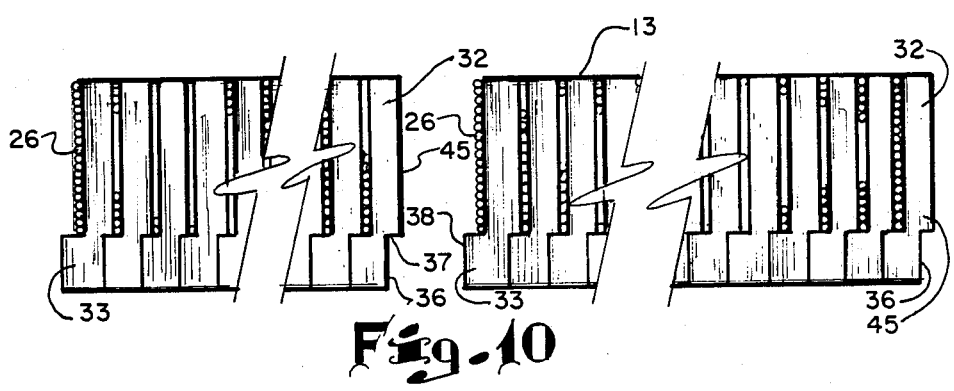
FIG. 10 is an end elevation view of the wide end of two of the image transfer devices that are separated before being brought together in a modular assembly.

The support body 21 above described is particularly suitable for being stacked side by side and end to end to enlarge the end surfaces as required. A modular assembly of two of the devices which form end surfaces 13 side by side and two more end to end is shown in FIG. 11. The two side by side are shown separated in FIG. 10 but when brought together the projecting portion 33 and ribbon portion 26 along one side mate with the notched portion 43 and surface 45 of the adjacent device to provide uniformity in the succession of the fiber ribbon 26 and spacer portion 32 between the two devices.

A pin 57 extends through aligned holes in the projecting portion 33 of the bodies 21 to position these bodies and hold them side by side.

Figure 12A:
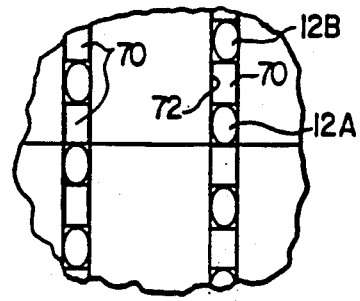
FIG. 12A is a fragmentary plan view of a portion of the modular assembly shown in FIG. 11 in the low resolution embodiment of the invention.
Figure 8:
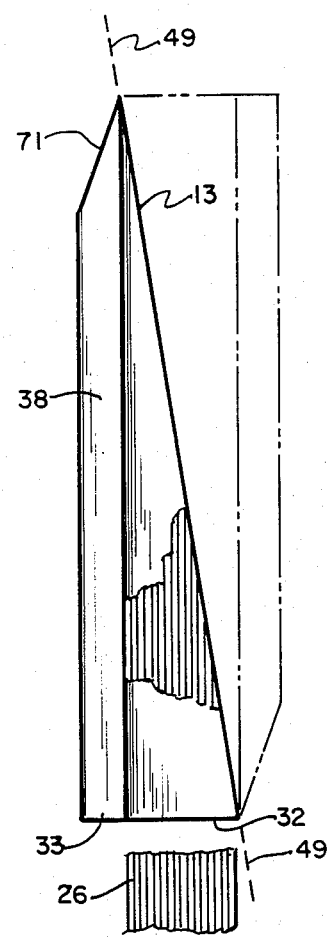
FIG. 8 is a side elevation view of the locator body with only portions of the fiber ribbon shown in place.
Figure 9:
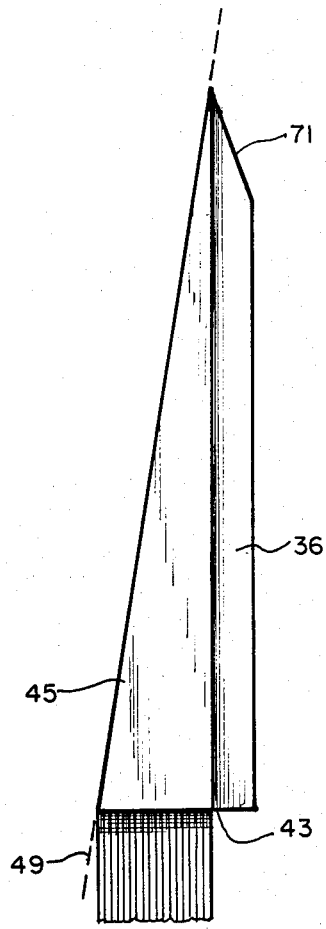
FIG. 9 is a side elevation view of the opposite side of the locator body.

For stacking end to end an angular cut 71 is provided along projecting section 33 at the narrow end to allow the ribbons to pass along the back side of the modular array, as shown in FIG. 12. In the end to end stacking of the devices forming end surfaces 13 the ribbons line up in straight lines and the spacer portions 32 line up in straight lines. It is noted in FIG. 11 that the end surface 13 of the device 11 in the upper right-hand corner has its end surface 14 also in the upper right-hand corner. The fibers in the end surface proceed from top to bottom, while corresponding fibers at end surface 14 proceed from bottom to top in the ribbon.

A block 65 is shown adjacent surface 14 in the modular assembly. This may be used for inputting light by a variety of means including, but not limited to, kinescopes (crt), microshutters with a light source behind, lasers, liquid crystal shutters, or similar light control mechanisms. The cut ends of the fibers may be coated with a material such as phosphorus, encased in a vacuum, and may have either light or electron beams projected at the cut end surface. If the direction of light were to be reversed through the device 11, the block 65 would be receiving light from a source at end surface 13.

In a specific example of the construction and use of the light transfer device, the lateral extent or width of surface 13 is 8" and the vertical extent is 6" for a 4:3 width to height ratio. Each ribbon is 1" wide and contains 333 fibers, each of which is 0.003" in diameter. The center to center spacing of the ribbons is 0.018". The spacer section is 0.015". The matrix at the end surface 14 is 1" by 1.332", providing a gain of 36:1. The angle of cut A is 9.6°.

A preferred fiber for this application is in the range of 3 to 100 microns in diameter and has a wavelength of 400-700 nanometer. The fiber is coated black to prevent crosstalk and has a 3 db. loss over 1000'. If the ends are coated with a phosphor, an electron beam is able to excite these ends.

Figure 7:
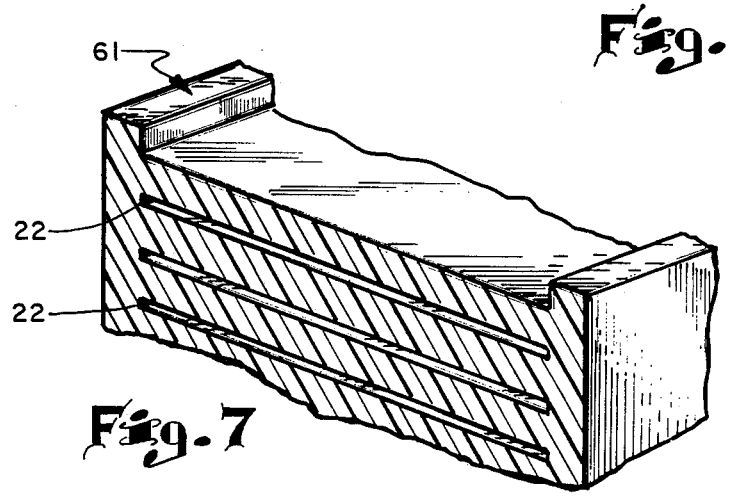
FIG. 7 is a perspective view of a portion of a solid locator body.
Figure 5A:
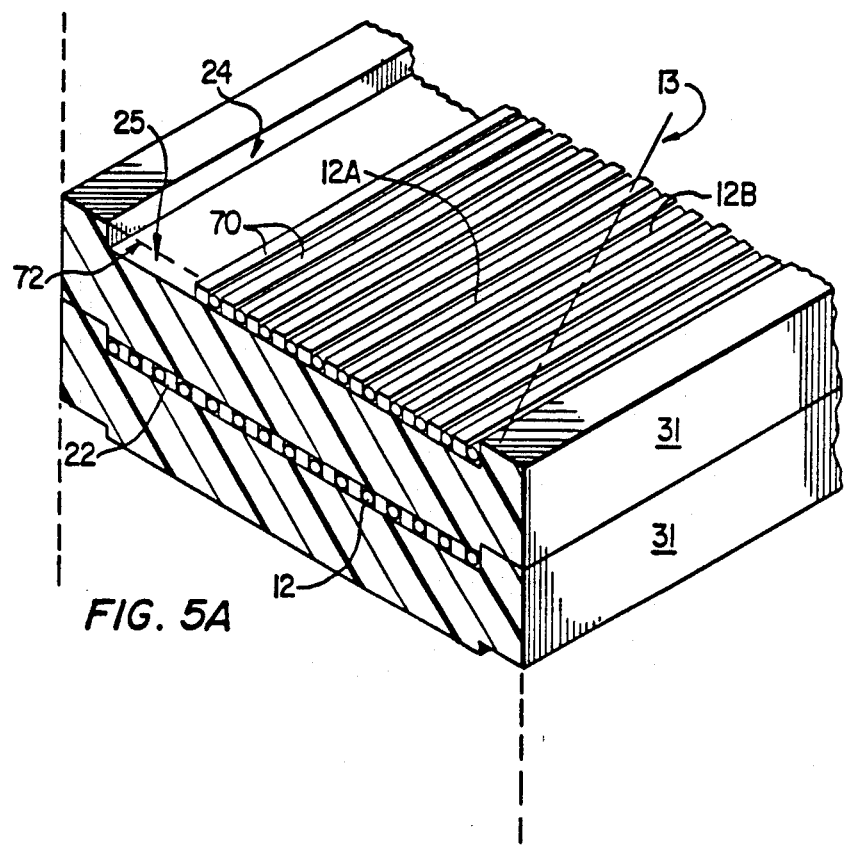
FIG. 5A is an alternate embodiment of the assembly of FIG. 5 wherein a low resolution fiber optic light transfer device is produced by using a plurality of selectively-spaced projections in each slot of the locator body.

Referring now to FIG. 5A, an alternate embodiment of the locator body of the light transfer device is shown. This embodiment produces a display screen using significantly smaller amounts of optical fiber as compared to the embodiment of FIG. 1 by decreasing the resolution of the displayed image. By way of example only, each of the locator members 31 is now made twice as thick as compared to the thickness of each member in FIG. 5, and each of the fiber ribbons of the device includes a plurality of spaced optical fibers 12A...12N rather than a series of fibers in abutting side-by-side relation. To support each fiber ribbon, a plurality of selectively spaced projections 70 are formed integral with the first supporting surface 25 of each slot 22 during manufacture of each locator member 31 or during manufacture of the block 61 according to FIG. 7.

The projections 70 cooperate with the longitudinal spaces between the plurality of spaced optical fibers 12A...12N in each fiber ribbon to form a low resolution fiber optic light transfer device Preferably, the resulting device includes "n" fiber optic ribbons each having "n" fibers 12. If "n−1" projections are integrally formed in each slot 22 to support the "n" fibers, the resulting device produces an image with one-half the resolution of the image produced by the display in FIG. 1. However, because every other fiber ribbon is replaced by a double-thickness locator body member and the remaining ribbons require only one-half as many fibers, the device of FIG. 5A uses seventy-five (75%) percent less fiber than the device of FIG. 1. In this alternate embodiment, the brightness of the image input to the device is preferably increased to overcome the decrease in resolution.

The height and width of each projection 70 in FIG. 5A is preferably equal to the height and width of each optical fiber, and each projection 70 extends along substantially the entire length of the first supporting surface 25 of each slot. Moreover, if devices of varying resolution are desired, the projections 70 are selectively spaced between "groups" of optical fibers in each ribbon rather than being spaced between every other fiber. Each projection 70 may therefore be placed after every fourth fiber, for example, in which case the relative size of each locator member 31 would be adjusted accordingly to insure that the displayed image is not distorted.

In the alternate embodiment of FIG. 5A, a locator body 21 for end surface 13 is formed having a plurality of slots 22 therein. Referring to FIG. 5A, each of the slots is defined by the first supporting surface 25, the second supporting surface 24 perpendicular to the first supporting surface, a third supporting surface 72 parallel to the first supporting surface, and the end surface 13 of the locator body. As described above, the first, second and third supporting surfaces mechanically hold the optical fibers in each ribbon against movement relative to one another with respect to the first, second and third planes, respectively, in which these surfaces are oriented. According to the alternate embodiment, the first (or third) supporting surface includes at least one projection 70 such that at least two of the fibers in each ribbon are in a spaced relationship. In the preferred embodiment, a plurality of projections 70 are selectively spaced along each slot 22 to vary the resolution of the resulting image. If a plurality of the variable resolution locator bodies are stacked side by side and end to end as described above with respect to FIG. 11, the end surface 13 of the resulting low resolution device has the structure shown in FIG. 12A.

In the variable resolution embodiment, the opposite (or matrix) end portions of the fiber ribbons are supported using a locator body such as shown in FIG. 1. Each of the channel shaped members 61 therein has a thickness equal to the thickness of the members forming the locator body 21. The channel shaped members 61 decrease in thickness along their length to bring the fibers to a solid bundle having a uniform array of rows and columns.

Although the present invention has been described with a certain degree of particularity, it is understood that the present disclosure has been made by way of example and that changes in details of structure may be made without departing from the spirit thereof.

I claim:

1. A low resolution fiber optic light transfer device, comprising:
    a plurality of optical fibers arranged as a series of spaced, parallel fiber ribbons;
    a locator body having a series of spaced, parallel flanged locator body portions arranged parallel to the fiber ribbons, the flanged locator body portions defining a multiplicity of spaced, parallel slots extending through said body in which said ribbons are disposed, each said locator body portion having a spacer and a flange projecting out from one end of said spacer, said flanges being arranged end-to-end and said spacers being arranged in spaced parallel planes, said ribbons and spacers being successively arranged in an alternating series, each said flange having a first supporting surface against which the face of an associated ribbon is positioned, and a second supporting surface against which an end fiber of the associated ribbon is positioned, the first and second supporting surfaces being disposed in first and second mutually perpendicular planes; and a plurality of projections selectively spaced along the first supporting surface of each flange such that at least two of the fibers of the associated fiber ribbon are in a spaced relationship;

wherein said fiber ribbons have exposed fiber ends terminating along a plane rotated ninety (90) degrees to the plane of each ribbon and at an angle to said rotated plane to define an end surface with said exposed fiber ends.

2. The fiber optic light transfer device as described in claim 1 wherein the width of each projection is substantially equal to the width of each optical fiber in the fiber ribbon.

3. The fiber optic light transfer device as described in claim 1 wherein the height of each projection is substantially equal to the height of each optical fiber in the fiber ribbon.

4. The fiber optic light transfer device as described in claim 1 wherein each projection extends substantially along the entire length of the first supporting surface of each flange.

5. The fiber optic light transfer device as described in claim 1 wherein the plurality of projections are equally-spaced along the first supporting surface of each flange.

6. The fiber optic light transfer device as described in claim 5 wherein each of the optical fibers of the fiber ribbon are located adjacent one of the projections.

7. The fiber optic light transfer device as described in claim 6 wherein the width of each projection is substantially equal to the width of each optical fiber.

8. The fiber optic light transfer device as described in claim 6 wherein the height of each projection is substantially equal to the height of each optical fiber.

9. The fiber optic light transfer device as described in claim 6 wherein each of the projections extends along substantially the entire length of the first supporting surface of each flange.

10. A low resolution fiber optic light transfer device, comprising:

a plurality of optical fibers arranged as a series of spaced, parallel fiber ribbons;

a locator body having a series of spaced, parallel flanged locator body portions arranged parallel to the fiber ribbons, the flanged locator body portions defining a multiplicity of spaced, parallel slots extending through said body in which said ribbons are disposed, each said locator body portion having a spacer and a flange projecting out from one end of said spacer, said flanges being arranged end-to-end and said spacers being arranged in spaced parallel planes, said ribbons and spacers being successively arranged in an alternating series, each said spacer having a supporting surface against which the face of an associated ribbon is positioned; and a plurality of projections selectively spaced along the supporting surface of each spacer such that at least two of the fibers of the associated fiber ribbon are in a spaced relationship;

wherein said fiber ribbons have exposed fiber ends terminating along a plane rotated ninety (90) degrees to the plane of each ribbon and at an angle to said rotated plane to define an end surface with said exposed fiber ends.

* * * * *